July 4, 1950  J. H. SCHMID  2,513,750
PLUMBING FITTING ASSEMBLY
Filed Sept. 20, 1946  2 Sheets-Sheet 1
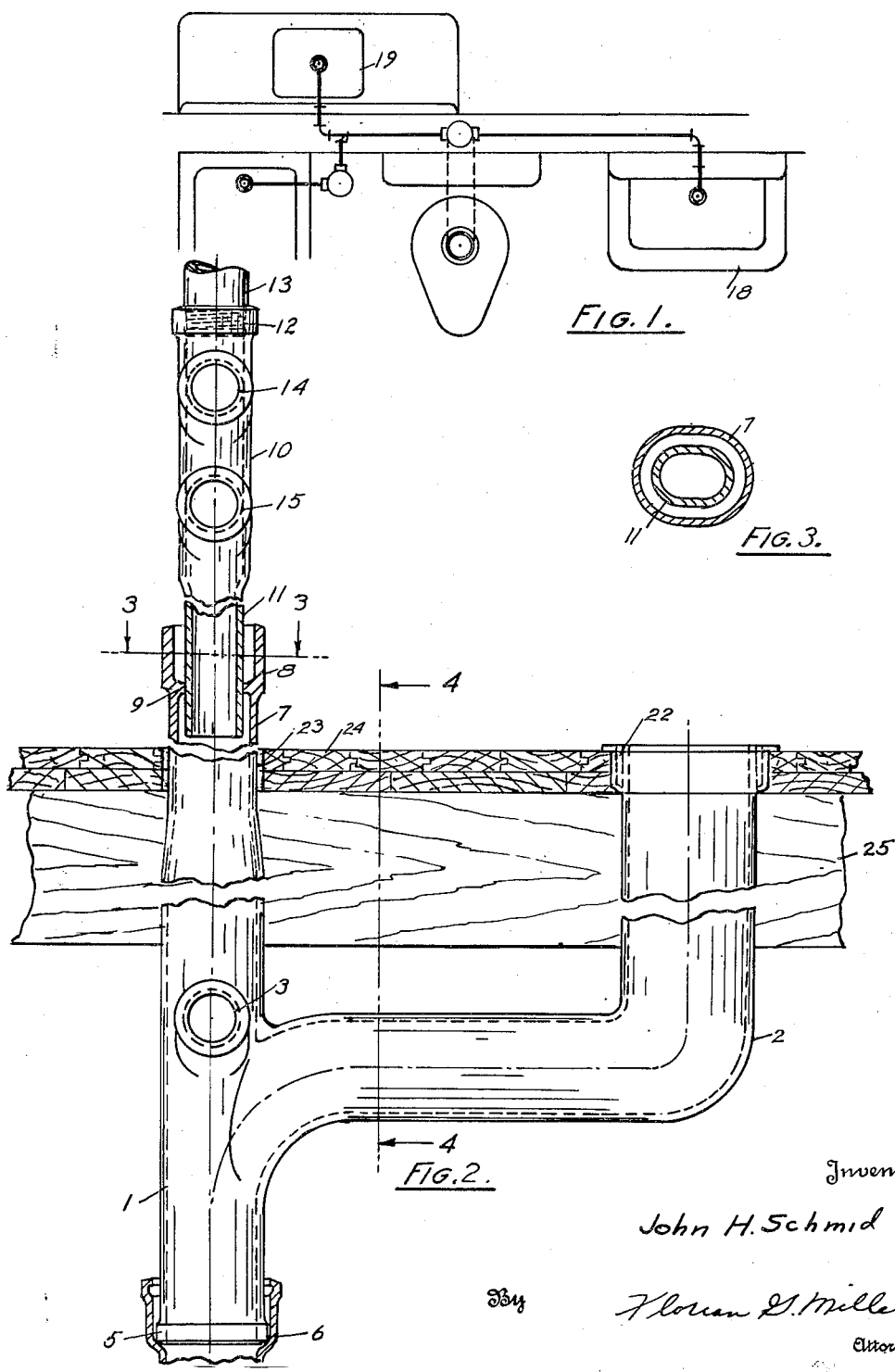
Inventor
John H. Schmid
By Florian G. Miller
Attorney July 4, 1950 J. H. SCHMID 2,513,750
PLUMBING FITTING ASSEMBLY
Filed Sept. 20, 1946 2 Sheets-Sheet 2
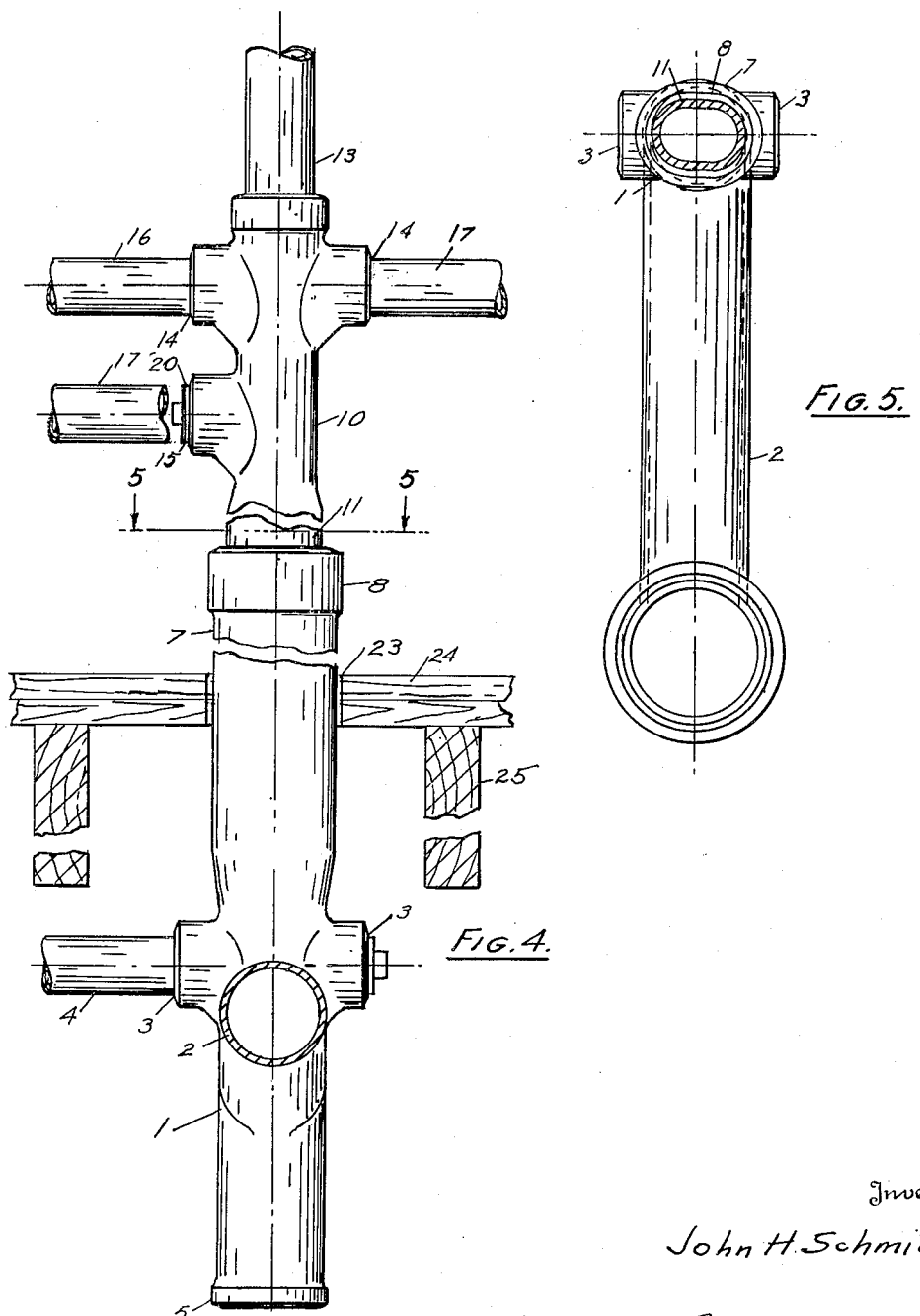

Patented July 4, 1950

2,513,750

UNITED STATES PATENT OFFICE 2,513,750

PLUMBING FITTING ASSEMBLY

John H. Schmid, Erie, Pa., assignor to J. A. Zurn Manufacturing Company, Erie, Pa., a corporation of Pennsylvania Application September 20, 1946, Serial No. 698,267

4 Claims. (Cl. 4—211)

This invention relates generally to plumbing fittings, and more particularly to adjustable fitting assemblies.

Many of the houses built today, especially prefabricated houses, utilize 2" x 4" stud partitions. It has been impossible to place properly sized waste and vent systems in these partitions, as required by federal, state and city plumbing codes, with conventional fittings. Much difficulty has been encountered where part of the drainage system has been installed at the factory and the remainder of the fittings in the stack layout are installed at the site. No adjustment has been provided in these prior fittings and much time and labor has been required in the cutting and fitting of pipe lines and fittings. Furthermore, these prior fittings have not been adaptable to meet varied situations without expending a vast amount of labor at the site. None of these prior assemblies has provided for universal adaptability particularly in home construction.

It is, accordingly, an object of my invention to overcome the above and other defects in plumbing, waste and/or vent fittings, and it is more particularly an object of my invention to provide a plumbing fitting assembly which is simple in construction, adaptable to a plurality of layouts, economical in cost, easy to install, and efficient in operation.

Another object of my invention is to provide a plumbing fitting assembly which has a maximum of adjustment of the assembled fittings.

Another object of my invention is to provide a plumbing fitting assembly wherein the roughing height for all connections is adjustable.

Another object of my invention is to provide a substantially elliptical shaped drainage connection for utilization of partitions of minimum width.

Another object of my invention is to provide a plumbing fitting assembly which has efficient venting means.

Another object of my invention is to provide a plumbing fitting assembly wherein the closet and tub connections are adjustable downwardly for varying depths of floor joists.

Another object of my invention is to provide a plumbing fitting assembly which permits the use of standard length soil pipe without cutting for standard depth basements and/or the use of double hub soil pipe in exact one-half lengths to minimize pipe cutting and eliminate short scrap pieces of pipe.

Another object of my invention is to provide a plumbing fitting assembly with means for attaching a pipe stack vent.

Another object of my invention is to provide a plumbing fitting assembly which has universal adaptability in one floor home layouts, the basic principles of which may also be applied in multistoried structures.

Another object of my invention is to provide a plumbing fitting assembly which is especially adaptable for installation in prefabricated houses, so that work to be done at the home site will be at a minimum.

Other objects of my invention will become evident from the following detailed description, taken in conjunction with the accompanying drawings, in which:

Fig. 1 is a schematic plan view of my novel plumbing fitting assembly with drainage connections to a lavatory, tub, closet, and sink;

Fig. 2 is a side elevational view with parts broken away of an embodiment of my novel plumbing fitting assembly;

Fig. 3 is a view taken on the line 3—3 of Fig. 2;

Fig. 4 is a view taken on the line 4—4 of Fig. 2; and

Fig. 5 is a view taken on the line 5—5 of Fig. 4.

Referring now to the drawings, Figs. 1 to 5, inclusive, show a fitting 1 with an outwardly and upwardly extending branch portion 2 for making a water closet connection. The fitting 1 has laterally extending threaded apertures 3 for connection to drainage lines 4 such as a drainage line from a tub or shower. The lower end of the fitting 1 has a spigot end 5 for engagement with a hub 6 of any conventional base fitting, pipe, or an insert fitting. The upper end 7 of the fitting 1 is formed substantially elliptical in shape as illustrated in Fig. 3 and has a hub portion 8 and an internal outwardly projecting portion 9 for centering the elliptically shaped connecting end 11 of fitting 10. The elliptical shape of the connecting end portions of the fittings 1 and 10 is provided in order that a cross sectional area of the fittings is equal to or greater than the rounded portion of the fittings, thereby permitting the installation of this fitting in a partition of minimum width. The upper end of the fitting 10 is internally threaded at 12 for engaging the threaded end of a pipe vent 13, which extends to the outer side of the building. The fitting 10 has laterally extending apertures 14 and 15 threadably engaging the threaded ends of drain pipes 16 and 17 such as the drain lines from a lavatory 18 and a sink 19, as shown schematically in Fig. 1. It will be evident that with three threaded apertures 14 and 15 in fitting 10 for connections to drain pipes, my novel fitting assembly is adaptable to almost any type of installation, but it is not the intent of this application to limit the number of apertures for connection to fittings. In the conventional installation, any two of the threaded apertures 14 and 15 in the fitting 10 will be utilized as illustrated in Fig. 1, wherein the other aperture can be closed by a screw plug 20 as shown in Fig. 4. It will be evident by inspection that the inlets vent above the crown of branch lines. Roughing height for lavatory and sink connections is adjustable by moving fitting 1 or 10 longitudinally to vary the position of the elliptical end 11 of the fitting 10 in the hub 8 of the fitting 1. The closet and tub connections are also adjustable downwardly to provide for a varying depth of floor joists 25 wherein a longer closet flange 22 is utilized. Since the fitting 1 is adjustable vertically and the length of the fitting 1 below the floor is so provided, standard lengths of soil pipe may be used in a standard depth basement or the spigot end 5 of the fitting 1 may connect directly to a conventional stack base fitting usually provided in homes without basements. The cleaning of my novel fitting assembly is simplified in that there is direct in-line access to the drainage system of the building. It will be evident that conventional adjustable connections may be disposed in the branch line 2 of the fitting 1 to provide for adjustment thereof.

In operation, fitting 1 is disposed in aperture 23 in the floor 24 and fitting 10 is disposed above the fitting 1 with the elliptical shaped connecting portion 11 thereof in engagement with the outwardly projecting portion 9 in the elliptically shaped end 7 of the fitting 1. The connections to the apertures 3 in the fitting 1 and the apertures 14 and 15 in the fitting 10 are roughed in. Connections are then made to the base hub 5 of a base fitting and all joints are caulked in conventional manner. The vent pipe 13 is then connected to the fitting 10 or this may be done before the joints are caulked. Where part of the fittings and plumbing accessories are installed at the factory in prefabricated houses, fitting 1 may be eliminated from installation at the factory and installed at the home site with a minimum of time and labor.

It will be evident from the foregoing that I have provided a novel plumbing fitting assembly which is especially adaptable for one floor house layouts but whose principles may be adapted to multifloor layouts, which is adjustable vertically over a considerable distance to provide adaptability in making connections for many different types of layouts, which is simple in construction and economical in cost, which has efficient air venting, which provides a plurality of connections adaptable for any form of layout, and which is adaptable for connection to pipe fittings leading to a sewer line without cutting and fitting of pipe.

Various changes may be made in the specific embodiment of my invention without departing from the spirit thereof, or from the scope of the appended claims.

What I claim is:

1. A plumbing fitting assembly comprising a fitting having a laterally extending branch portion for connection to a water closet, apertures for pipe connections and a substantially elliptical shaped hub, and a second fitting adapted for disposal in a comparatively small dimensional wall having a substantially elliptically shaped end for slip connection to the elliptically shaped hub of said first mentioned fitting, and laterally extending apertures for pipe connections.

2. A plumbing fitting assembly as set forth in claim 1, wherein said first mentioned fitting has an internal projecting portion adjacent the hub end thereof for centering said elliptical end of said second fitting in the hub end of the said first mentioned fitting.

3. A plumbing fitting assembly as set forth in claim 1, wherein said second fitting has an aperture for engaging a vent pipe.

4. A plumbing fitting assembly comprising a fitting having laterally extending apertures for connection to pipe lines, an off-set branch line for connection to a water closet and a substantially elliptically shaped hub with the longitudinal axis substantially normal to said branch line, and a second fitting adapted for disposal in a comparatively small dimensional wall having a substantially elliptically shaped connecting end for slip connection to said elliptically shaped hub of said first mentioned fitting.

JOHN H. SCHMID.

REFERENCES CITED

The following references are of record in the file of this patent:

UNITED STATES PATENTS

| Number | Name | Date |
|---|---|---|
| 244,000 | Townsend | July 5, 1881 |
| 385,148 | Stewart et al. | June 26, 1888 |
| 901,545 | Morrison | Oct. 20, 1908 |
| 2,379,669 | Warren | July 3, 1945 |